Patented May 29, 1928.

1,671,384

UNITED STATES PATENT OFFICE.

WINSTON F. STOODY, OF WHITTIER, CALIFORNIA.

ALLOY.

No Drawing.    Application filed November 12, 1925. Serial No. 68,728.

My invention relates to a welding alloy suitable for use for any welding rods in solid form or in the shape of a powder mixture confined in a steel or iron rod, to be used in processes wherein metal is fused by the electric arc or acetylene blowpipe and flowed into contact with heated solid metal for the purpose of welding, filling, coating or the like.

It is an object of this invention to provide a welding alloy that will result in a deposit of metal which is self-hardening, that is to say, hard enough so that it cannot be filed, and stiff enough so that it cannot be battered down.

It is another object of this invention to provide a welding alloy especially adapted for facing the cutting edges of oil well tools, drawing and trimming dies, machine cutting tools, such as lathe tools, boring and planing tools, and wherever a very hard cutting tool is required, and which has the qualities of the very best and high speed tool steel which will stay and which will cut when the tip of the tool is red hot.

In my Patent No. 1,559,015 dated October 27, 1925, I have described a welding rod containing iron, chromium between 4 to 10 per cent, manganese 2 to 8 per cent and silicon 1 and one-half to 4 per cent.

I have discovered that by changing the proportions, and especially increasing the chromium content of the alloy, I produce a welding alloy which may be applied with either the electric arc or acetylene torch in a smooth, even layer, without the aid of any flux, the deposited metal being very dense and absolutely free from blowholes or cracks, which makes the alloy valuable not only in repairing but in manufacturing articles.

Another object of this invention is to compound an alloy in which compensation is made in the proportions of the ingredients for the lower volatizing or melting point of some of the ingredients as compared with others, so that the final composition of the deposited metal alloy contains ingredients in the proper proportions for the results intended, such as toughness and hardness.

My invention consists in the alloy hereinafter described and claimed.

I take the following ingredients:

|  | Per cent. |
|---|---|
| Ferro-chromium | 45.80 |
| Containing 65% of chromium. | |
| Ferro-manganese | 10.55 |
| Containing 80% of manganese. | |
| Ferro-silicon | 2.15 |
| Containing 50% of silicon. | |
| Mild steel | 41.50 |

If the alloy is to be used in solid sticks the ingredients mentioned are melted in a furnace and cast into sticks of suitable size and shape. If the new alloy is to be used in the form of the conventional welding rod, the mild steel is rolled into a hollow tube and ferro-chromium, ferro-manganese and ferro-silicon are powdered and thoroughly mixed together and placed within the tube or may be associated with a tube or a solid rod of steel in any preferred manner.

The ferro-manganese, ferro-chromium and ferro-silicon contain small quantities of carbon, and the ferro-manganese and ferro-chromium contain also small quantities of silicon so that the alloy, when analyzed for its total content gives the following result:

|  | Per cent. |
|---|---|
| Fe | 58.50 |
| C | 2.00 |
| Si | 2.00 |
| Mn | 8.00 |
| Cr | 29.50 |

The chromium and manganese make an alloy with a steel having both the desired hardness and abrasion resisting qualities. The addition of the silicon causes the alloy to flow more easily and prevents gasifying. No special skill is required in applying the alloy and any competent welder can obtain excellent results. In applying the alloy to lathe tools or machine cutting tools where a special hardness and toughness is required, it is necessary to keep each layer in a molten state a little longer than is usual with other tools by allowing the torch to play upon it. This is important where toughness is required. The welder need not be afraid of burning the metal, as refining is taking place at the time the metal is molten; it does not detract from its hardness, but only adds to the toughness.

The hardness number as shown by the Schore scleroscope on the deposited metal is 70.

The proportions of the ingredients may be changed within certain limits and still give good results.

The carbon content of the finished alloy may be from 1 to 4%, silicon 1 to 4%, manganese 4 to 16%, chromium 15 to 35%, and iron the remainder to make a total of 100%.

Various changes may be made in the arrangement of parts by those skilled in the art, without departing from the spirit of my invention, as claimed.

I claim:

1. A welding alloy containing chromium between 15 and 35%, manganese 4 to 16%, silicon 1 to 4%, and the remainder principally iron.

2. A welding alloy containing chromium approximately 29.50%, manganese 8%, silicon 2%, and the remainder principally iron.

3. A welding alloy containing chromium approximately 29.50%, manganese 8%, silicon 2%, carbon 2%, and the remainder principally iron.

In testimony whereof I have signed my name to this specification.

W. F. STOODY.